United States Patent
Kohara

(10) Patent No.: US 8,498,032 B2
(45) Date of Patent: Jul. 30, 2013

(54) IMAGE READING APPARATUS AND METHOD FOR PROCESSING IMAGES

(75) Inventor: Ryuichi Kohara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/538,550

(22) Filed: Jun. 29, 2012

(65) Prior Publication Data

US 2012/0268798 A1    Oct. 25, 2012

Related U.S. Application Data

(63) Continuation of application No. 12/320,369, filed on Jan. 23, 2009, now Pat. No. 8,218,209.

(30) Foreign Application Priority Data

Jan. 24, 2008    (JP) ................................ 2008-013742

(51) Int. Cl.
  *H04N 1/40* (2006.01)
(52) U.S. Cl.
  USPC ............................ 358/528; 358/448; 358/451
(58) Field of Classification Search
  USPC ......... 358/1.15, 442, 448, 528, 451; 382/232, 382/234, 239, 251; 348/207.1, 207.2
  See application file for complete search history.

(56) References Cited

U.S. PATENT DOCUMENTS

| | | | | |
|---|---|---|---|---|
| 4,937,681 A * | 6/1990 | Fujinawa et al. | ............. | 382/234 |
| 5,121,221 A * | 6/1992 | Hamano et al. | .......... | 358/426.01 |
| 5,293,432 A * | 3/1994 | Gonser et al. | ................ | 382/299 |
| 5,553,160 A * | 9/1996 | Dawson | ........................ | 382/166 |
| 5,987,165 A | 11/1999 | Matsuzaki et al. | | |
| 6,237,010 B1 | 5/2001 | Hui et al. | | |
| 6,542,260 B1 * | 4/2003 | Gann et al. | ..................... | 358/471 |
| 6,583,887 B1 * | 6/2003 | Clouthier et al. | ............ | 358/1.15 |
| 6,747,762 B1 * | 6/2004 | Josephsen et al. | ............ | 358/453 |
| 6,985,637 B1 | 1/2006 | Gindele | | |
| 7,000,157 B2 | 2/2006 | Okamoto et al. | | |
| 7,023,448 B1 | 4/2006 | Danciu | | |
| 7,089,286 B1 | 8/2006 | Malik | | |
| 7,397,575 B2 | 7/2008 | Sekiguchi | | |
| 7,557,950 B2 | 7/2009 | Hatta et al. | | |
| 7,610,346 B2 | 10/2009 | Otake | | |
| 7,684,633 B2 * | 3/2010 | Bai et al. | ........................ | 382/252 |
| 7,792,804 B2 * | 9/2010 | Tsutsumi | ...................... | 707/693 |
| 7,796,296 B2 | 9/2010 | Martinez et al. | | |
| 7,898,680 B2 * | 3/2011 | Misawa et al. | ............... | 358/1.15 |
| 8,085,446 B2 * | 12/2011 | Harada | .................... | 358/426.06 |
| 8,149,472 B2 * | 4/2012 | Ono | .............................. | 358/474 |
| 8,150,176 B2 * | 4/2012 | Gwak | ............................ | 382/232 |
| 8,229,235 B2 * | 7/2012 | Kim et al. | ..................... | 382/239 |
| 2002/0054711 A1 * | 5/2002 | Hwang et al. | .................. | 382/240 |
| 2002/0067860 A1 * | 6/2002 | Azam et al. | ................... | 382/239 |
| 2003/0103250 A1 | 6/2003 | Kidokoro et al. | | |

(Continued)

FOREIGN PATENT DOCUMENTS

JP    2007-067807    3/2007

*Primary Examiner* — Kimberly A Williams
(74) *Attorney, Agent, or Firm* — Rabin & Berdo, P.C.

(57) ABSTRACT

An image reading apparatus reads image information of an original document to produce image data having different data sizes. An image converting section converts the image information into a plurality of items of image data. A display section displays a plurality of items of information on the plurality of items of image data. A selecting section allows selecting of one of plurality of items of image data.

10 Claims, 17 Drawing Sheets

U.S. PATENT DOCUMENTS

| | | |
|---|---|---|
| 2004/0095292 A1 | 5/2004 | Ogura |
| 2005/0044158 A1 | 2/2005 | Malik |
| 2005/0094871 A1 | 5/2005 | Berns et al. |
| 2005/0219561 A1 | 10/2005 | Haikin |
| 2006/0012833 A1 | 1/2006 | Ito et al. |
| 2006/0044601 A1* | 3/2006 | Misawa et al. ............... 358/1.15 |
| 2006/0064418 A1 | 3/2006 | Mierau et al. |
| 2006/0098220 A1 | 5/2006 | Oh et al. |
| 2006/0232833 A1* | 10/2006 | Kim ............................. 358/474 |
| 2006/0291732 A1 | 12/2006 | Bai et al. |
| 2007/0070407 A1 | 3/2007 | Katou et al. |
| 2007/0223068 A1 | 9/2007 | Ishii et al. |
| 2008/0025642 A1 | 1/2008 | Kim |
| 2008/0036774 A1 | 2/2008 | Hirooka |
| 2008/0088882 A1 | 4/2008 | Hirose et al. |
| 2008/0123138 A1 | 5/2008 | Banerjee et al. |
| 2008/0130993 A1 | 6/2008 | Higashimoto |
| 2008/0134070 A1 | 6/2008 | Kobayashi et al. |
| 2008/0266578 A1 | 10/2008 | Matoba et al. |
| 2009/0007019 A1 | 1/2009 | Kobayashi et al. |
| 2009/0049150 A1 | 2/2009 | Malik |
| 2009/0136144 A1* | 5/2009 | Gwak .......................... 382/232 |
| 2009/0164927 A1 | 6/2009 | Nakahara |

\* cited by examiner

IMAGE READING APPARATUS AND METHOD FOR PROCESSING IMAGES

CROSS-REFERENCE TO RELATED APPLICATIONS

This application is a continuation, and claims the benefit under 35 U.S.C. §120 of the earlier filing date, of application Ser. No. 12/320,369, filed Jan. 23, 2009. Application Ser. No. 12/320,369 in turn claims the benefit under 35 U.S.C. §119 of the earlier filing date of Japanese application no. 2008-013742, filed Jan. 24, 2008.

BACKGROUND OF THE INVENTION

1. Field of the Invention

The present invention relates to an image reading apparatus and a method of processing images.

2. Description of the Related Art

A conventional image reading apparatus such as a network scanner reads the image of an original document, then converts the captured image information into image data in a predetermined data format, and finally transmits the image data to an external apparatus. Such a conventional apparatus may process the captured image signal to reduce the resolution of the image information, convert the image signal from color image to black image, or compress the image information. JP No. 2007-67807A discloses one such apparatus.

Specifically, the apparatus of JP No. 2007-67807A discloses a data transmitting apparatus. The apparatus processes input image data into a user's desired data size. The image data reduced in data size is displayed to the user, allowing the user to customize the data size of the image data while visually checking the data size. Then, the data transmitting apparatus processes the image data in the process specified by the user, thereby reducing the resolution of the image data before transmitting the image data to an external apparatus.

The data transmitting apparatus performs the processing of image data after the user specifies the data conversion. The image data has to undergo various stages of signal processing before the user obtains image data having a desired data size, requiring frequent user intervention as well as making the signal processing more complex.

SUMMARY OF THE INVENTION

The present invention was made in view of the drawbacks of conventional image reading apparatuses.

An object of the invention is to provide image information in a user's desired data size without difficulty.

Another object of the invention is to provide an image reading apparatus capable of preventing the network traffic from increasing.

An image reading apparatus reads image information of an original document to produce image data. An image converting section converts the image information into a plurality of items of image data having different data sizes. A display section displays a plurality of items of information on the plurality of items of image data. A selecting section allows selecting of one of plurality of items of image data.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

First Embodiment

An image reading apparatus of a first embodiment takes the form of a network scanner connected to, for example, a local area network (LAN). The image data captured by the scanner is transmitted to an external apparatus specified by a user over the LAN. The scanner provides a predetermined processing on the image data to obtain the image data having an appropriate data size.

Figure 1:
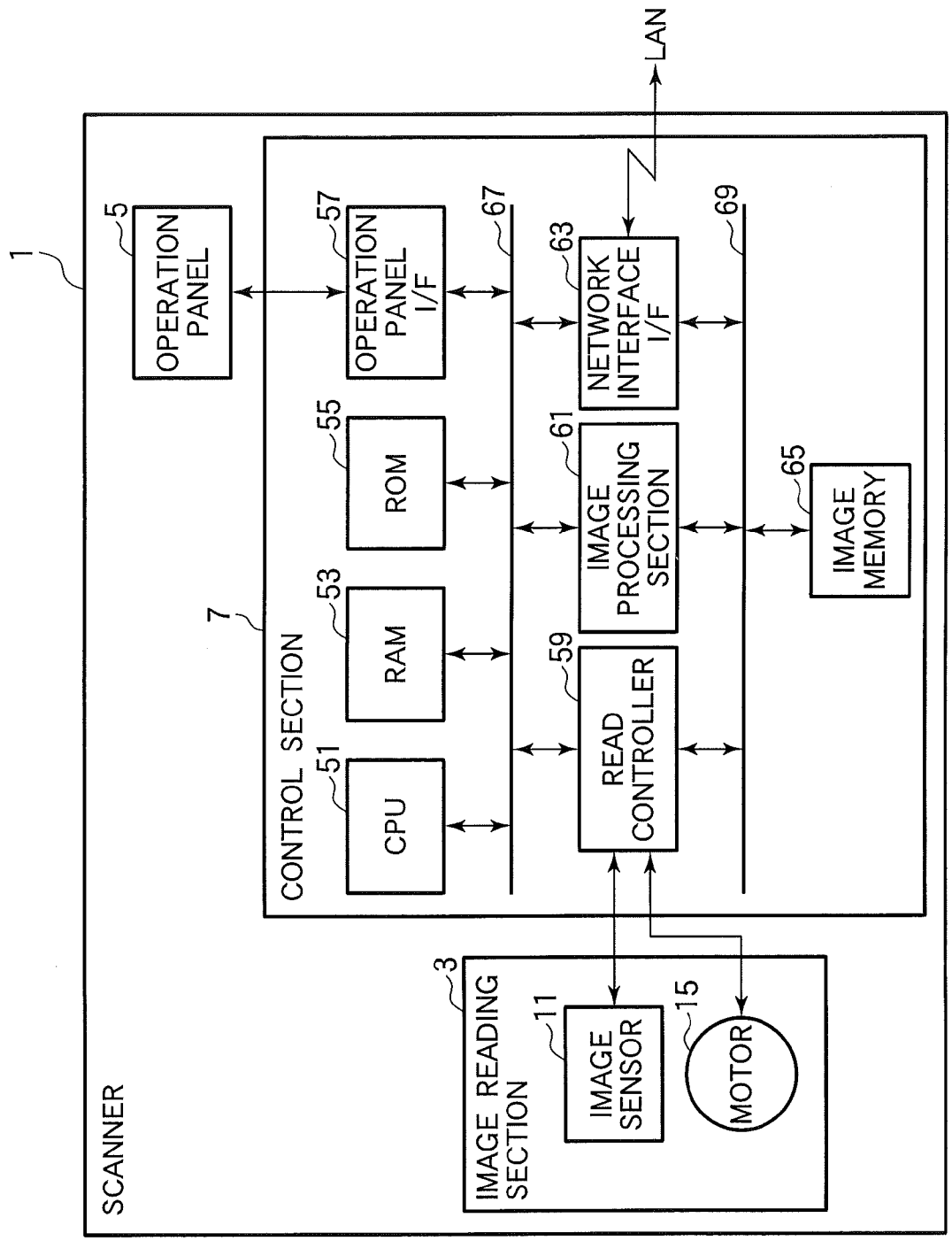
FIG. 1 is a block diagram illustrating a scanner of the first embodiment.
Figure 2:
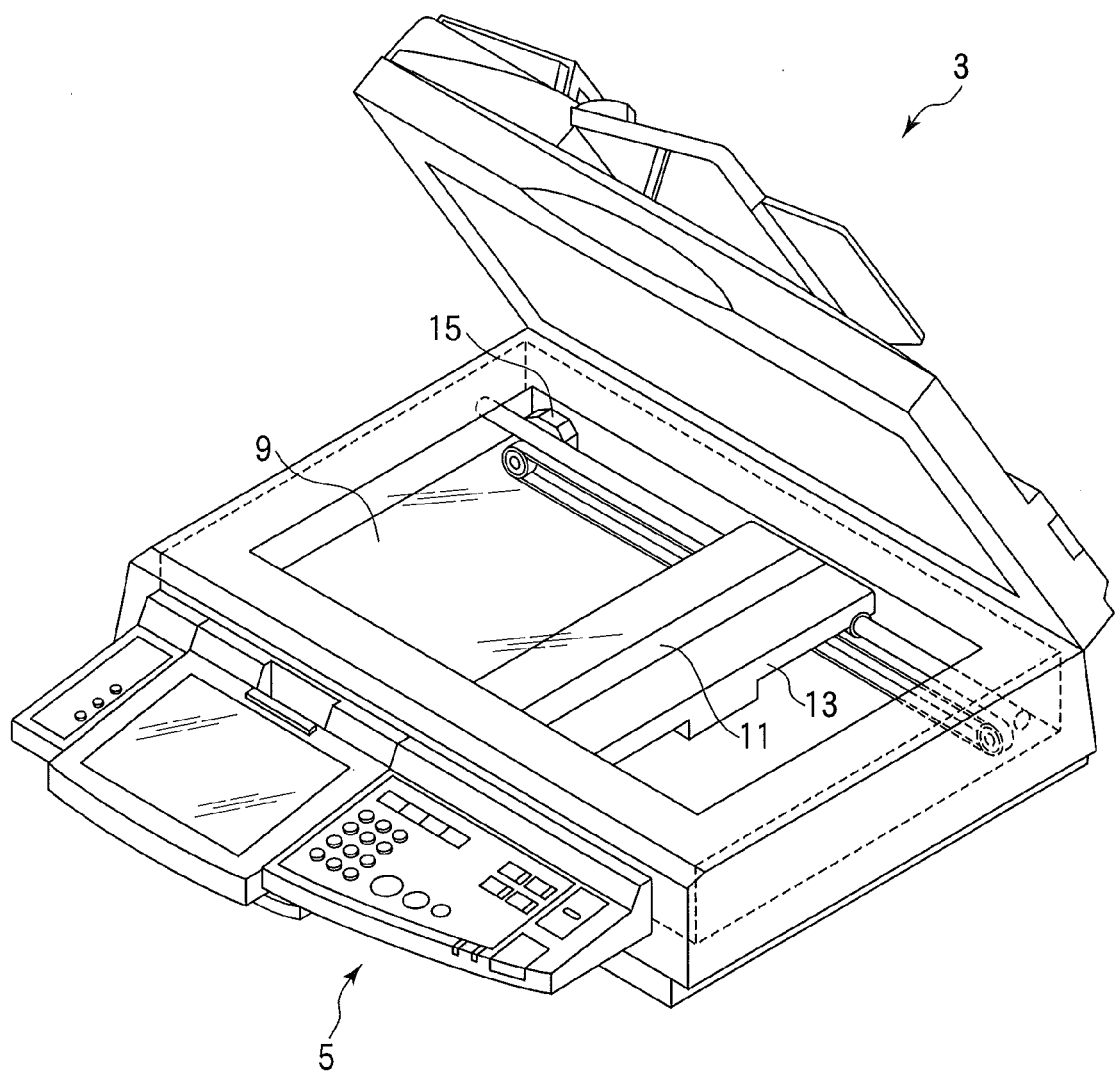
FIG. 2 is a perspective view of the scanner.

The first embodiment will be described in detail. FIG. 1 is a block diagram illustrating a scanner 1 of the first embodiment. FIG. 2 is a perspective view of the scanner 1.

Referring to FIG. 1, an image reading section 3 reads the image printed on an original document, e.g., printed paper. The user inputs various commands through an operation panel 5 into the scanner 1. Then, the scanner 1 provides various types of signal processing on the image captured by the image reading section 3, and the processed image data is transmitted to an external apparatus over the LAN.

The image reading section 3 may be of a flatbed type as shown in FIG. 2, and reads the image printed on the original document placed on a glass plate 9. Specifically, the image reading section 3 includes a reading sensor 11, a carriage 13, and a motor 15. The reading sensor 11 may take the form of a CCD image sensor that emits light to the original document and receives light reflected back from the original document. The reading sensor 11 is mounted on the carriage 13. The motor 15 may take the form of a stepping motor. The motor 15 drives the carriage 13 such that as the carriage 13 runs in the advance direction (along the original document), the reading sensor 13 scans the image of the original document to read the image. The captured image is an analog image signal and is then outputted to the controller 7.

Figure 3:
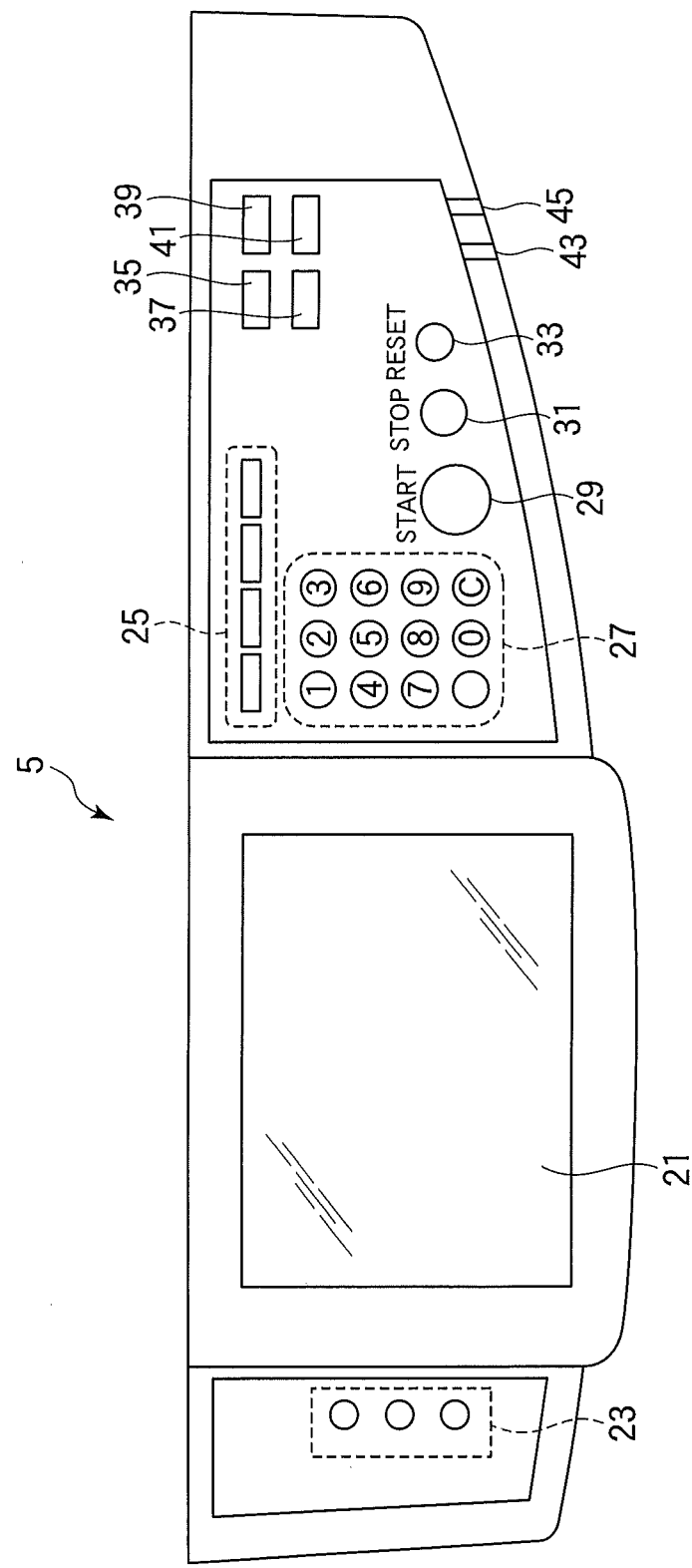
FIG. 3 is a top view of an operation panel of the scanner.

FIG. 3 is a top view of an operation panel of the scanner.

The operation panel 5 serves as an interface through which the user inputs various commands into the scanner 1. Referring to FIG. 3, a liquid crystal display (LCD) 21 displays various items of information to the user. An LCD adjusting key 23 adjusts the position of the various items of information displayed on the LCD 21. Mode keys 25 allow the user to select a specific mode of operation of the scanner 1. A numeric keypad 27 enables the user to input numerical values into the scanner 1. The user operates a start key 29 to command initiation of data processing in the selected mode of operation. The user operates a stop key 31 to stop the operation of the scanner 1. A reset key 33 is operated by the user to reset various settings inputted into the scanner 1. The operation panel 5 further includes an interrupt key 35, a help key 37, a power save key 39, a setting key 41, a power-on indicator 43, and an alarm lamp 45.

The LCD 21 takes the form of a touchscreen that displays software keys by which the user inputs his commands. The commands inputted through the LCD 21 are directed to the controller 7.

The mode keys 25 are used to specify a desired mode. The scanner 1 is capable of operating in various modes: COPY MODE, SCAN TO MAIL MODE, SCAN TO FILE TRANSFER PROTOCOL (FTP) MODE, and SCAN TO MAIL BOX MODE. COPY MODE is an operation mode in which an image as scanned is printed. When the scanner 1 operates in the COPY MODE, the scanner 1 transmits the image data read from the original document to a printer connected to the scanner 1, the printer printing the image data. When the scanner 1 operates in the SCAN TO MAIL MODE, the scanner 1 attaches the image data to an email, and transmits the email to a mail server connected to the scanner 1. When the scanner 1 operates in the SCAN TO FTP MODE, the scanner 1 converts the image data into an image file, and then transmits the image file to an FTP server. When the scanner 1 operates in the SCAN TO MAIL BOX MODE, the scanner 1 stores the image data into an image memory 65 which will be described later.

The controller 7 controls the operation of the respective portions of the scanner 1 in accordance with the commands inputted by the user through the operation panel 5. The controller 7 includes a central processing unit (CPU) 51, a random access memory (RAM) 53, a read only memory (ROM) 55, an operation panel interface (operation panel I/F, hereinafter) 57, a reading controller 59, an image processing section 61, a network interface 63, and the image memory 65. The reading controller 59 controls the operation of the image reading section 3. The image processing section 61 converts the image data into a specific data format. The image memory 65 stores the image data that has been converted into the specific data format.

The CPU 51 controls the overall operation of the scanner 1 by using a system memory, which is a part of the RAM 53. The CPU 51 operates in accordance with a program built in the ROM 55.

The operation panel I/F 57 receives various commands inputted through the operation panel 5, and directs the commands to the CPU 51 over the CPU bus 67. The operation panel I/F 57 also receives information from the CPU 51 over the CPU bus 67, and directs the received information to the operation panel 5. The operation panel 5 displays on the LCD 21 the information received from the operation panel I/F 57.

The reading controller 59 controls the image reading section 3. Specifically, the reading controller 59 provides predetermined drive signals to the reading sensor 11 and the motor 15 in accordance with the commands received from the CPU 5, and receives the analog image signal from the reading sensor 11. The reading controller 59 processes the received analog image signal by performing analog-to-digital conversion, shading correction, and γ correction, and then outputs a digital image signal obtained by the analog-to-digital conversion to an image bus 69 over which the digital image signal is supplied to the image processing section 61.

Figure 4:
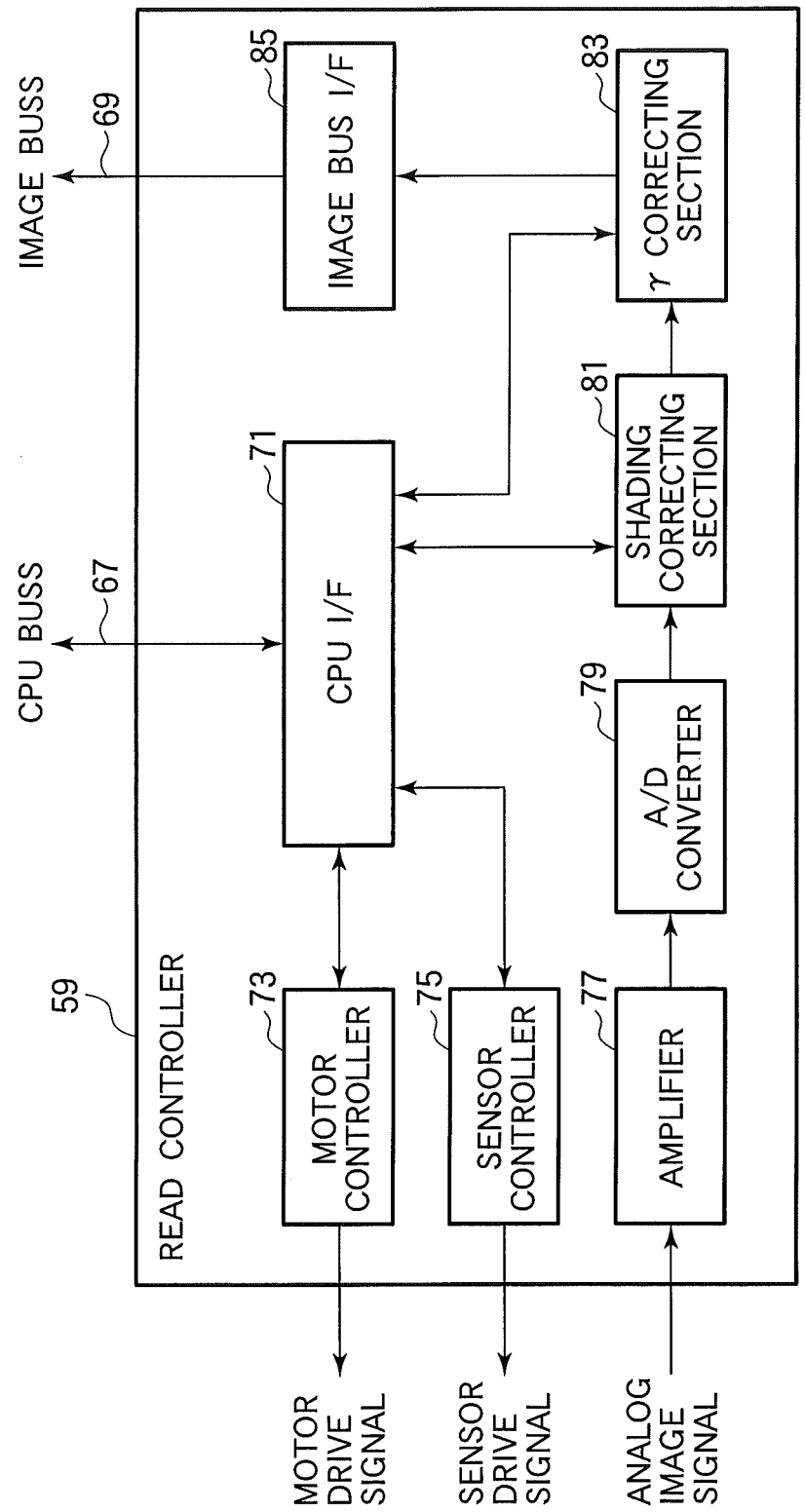
FIG. 4 is a block diagram illustrating a reading controller.

FIG. 4 is a block diagram illustrating the reading controller 59 in detail. A CPU I/F 71 functions as the interface between the CPU 51 and the reading controller 59. A motor controller 73 supplies a control signal to the motor 15 to control the operation of the motor 15. A sensor controller 75 supplies a sensor drive signal to the reading sensor 11 to control the operation of the reading sensor 11. An amplifier 77 amplifies the analog image signal received from the reading sensor 11. An analog-to-digital converter (A/D converter hereinafter) 79 performs analog-to-digital conversion on the analog image signal amplified by the amplifier 77. A shading correcting section 81 performs shading correction on the image data. A γ (gamma) correcting section 83 performs gamma correction on the image data. An image bus I/F 85 functions as the interface between the image bus 69 and the reading controller 59.

The motor controller 73 generates a motor drive signal in response to the command received from the CPU 5 through the CPU I/F 71, and supplies the drive signal to the motor 15 to control the motor 15. The sensor controller 75 also generates the sensor drive signal in response to the command received from the CPU 5 through the CPU I/F 71, and supplies the sensor drive signal to the reading sensor 11 to control the reading sensor 11.

The aforementioned signals drive the reading section 3 so that the image reading section 3 scans the image on the original document to capture the image. The captured image is an analog image signal and is inputted into the amplifier 77. The amplifier 77 amplifies the analog image signal, and supplies the amplified analog image signal to the A/D converter 79. The A/D converter 79 converts the analog image signal into the digital image signal. Then, the A/D converter 79 supplies the digital image signal to the shading correcting section 81. The shading correcting section 81 performs shading correction on the digital image signal, thereby removing uneven density or darkness of the image. Then, the shading correcting section 81 supplies the corrected digital image signal to the γ correcting section 83, which in turn performs the γ correction on the digital image signal. The digital image signal after γ correction is outputted to the image bus 69 through the image bus I/F 85. Then, the digital image signal is supplied to the image processing section 61 over the image bus 69.

The image processing section 61 performs a plurality of processes specified by the CPU 51 on the image data. Therefore, the image processing section 61 includes a plurality of processing sections that perform different types of signal processing, so that each processing section performs a corresponding processing on the image data and outputs a corresponding signal. In other words, the image processing section 61 receives a single item of image data and outputs a plurality of items of image data.

Figure 5:
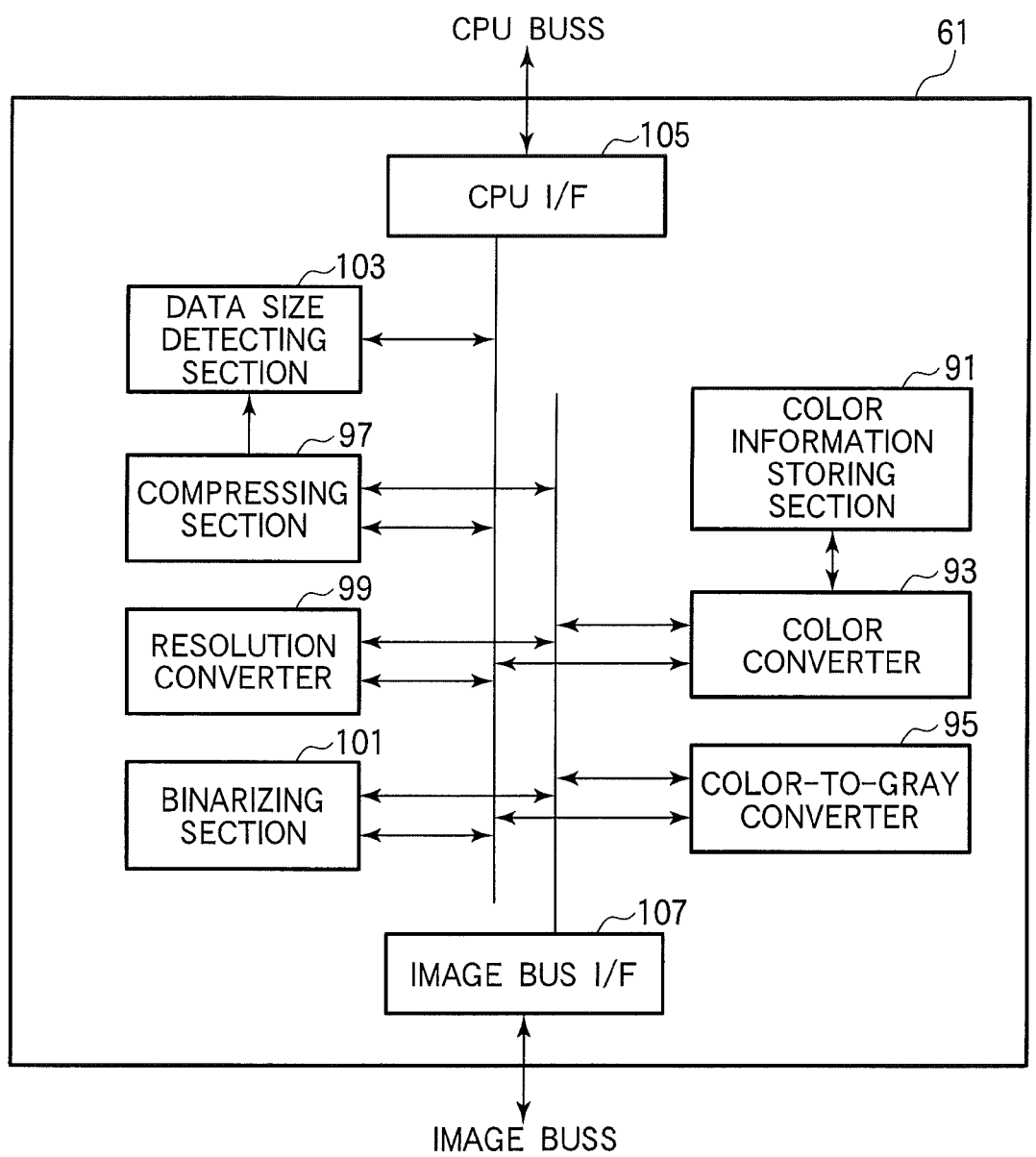
FIG. 5 is a block diagram illustrating an image processing section.

FIG. 5 is a block diagram illustrating the image processing section 61. A color information storing section 91 stores color conversion information that represents a plurality of color profiles. A color converter 93 performs color conversion on the image data in accordance with the color conversion information stored in the color information storing section 91. A color-to-gray converter 95 converts the color image data into gray image data. A compressing section 97 compresses the image data. A resolution converter 99 performs resolution conversion on the image data. A binarizing section 101 applies binarization process to the gray image data to generate binarized image data. A data size detecting section 103 detects the data size of each page of the compressed image data. A CPU I/F 105 functions as the interface between the CPU 51 and the image processing section 61. The image processing section 61 stores the processed image data into the image memory 65 through an image bus I/F 107 over the image bus 69.

Figure 6:
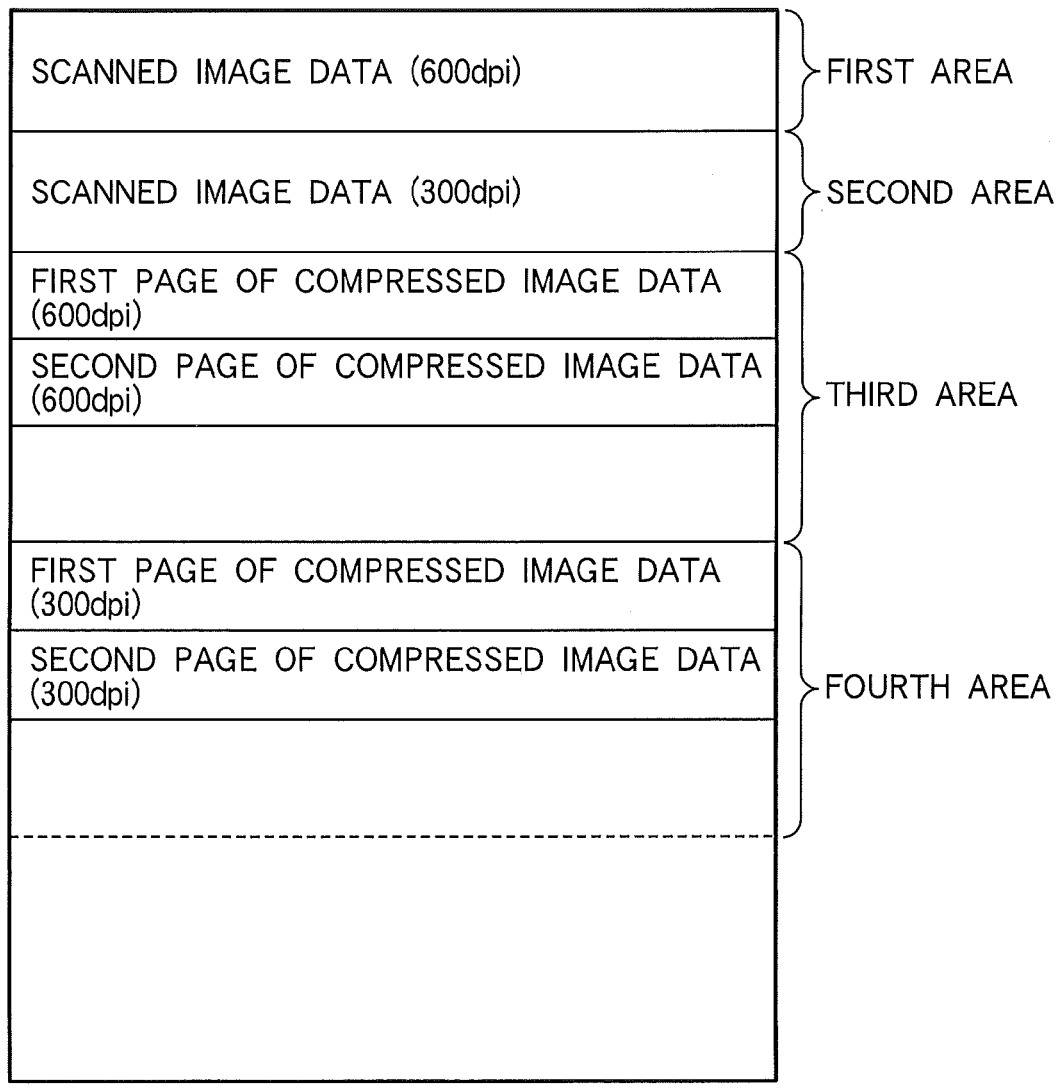
FIG. 6 illustrates first to fourth areas of an image memory and their contents.

FIG. 6 illustrates the first to fourth areas of an image memory 65 and their contents.

The image memory 65 stores a plurality of items of image data outputted from the image processing section 61. The image memory 65 is partitioned into a plurality of areas each of which stores a corresponding one of the plurality of items of image data. The areas include a first area that holds image data having a resolution of 600 dpi, a second area that holds image data having a resolution of 300 dpi, a third area that holds compressed image data having a resolution of 600 dpi, and a fourth area that holds compressed image data having a resolution of 300 dpi. When the image data is to be transmitted to an external apparatus, the image data stored in one of the first to fourth areas is read out. The items of image data stored in the first to fourth areas are overwritten every time a new corresponding item of image data is generated. The third and fourth areas store their corresponding items of data on a page-by-page basis. Every time the next succeeding page of the image data is generated, that page is added to a corresponding one of the first to fourth areas. For the sake of simplicity, the image memory 65 has been described as being partitioned into four areas in which two types of scanned image data and compressed data of the two types of scanned data are stored. The image memory 65 may be partitioned into as many areas as there are image processing functions so that each area stores image data of a corresponding image processing function.

Figure 7:
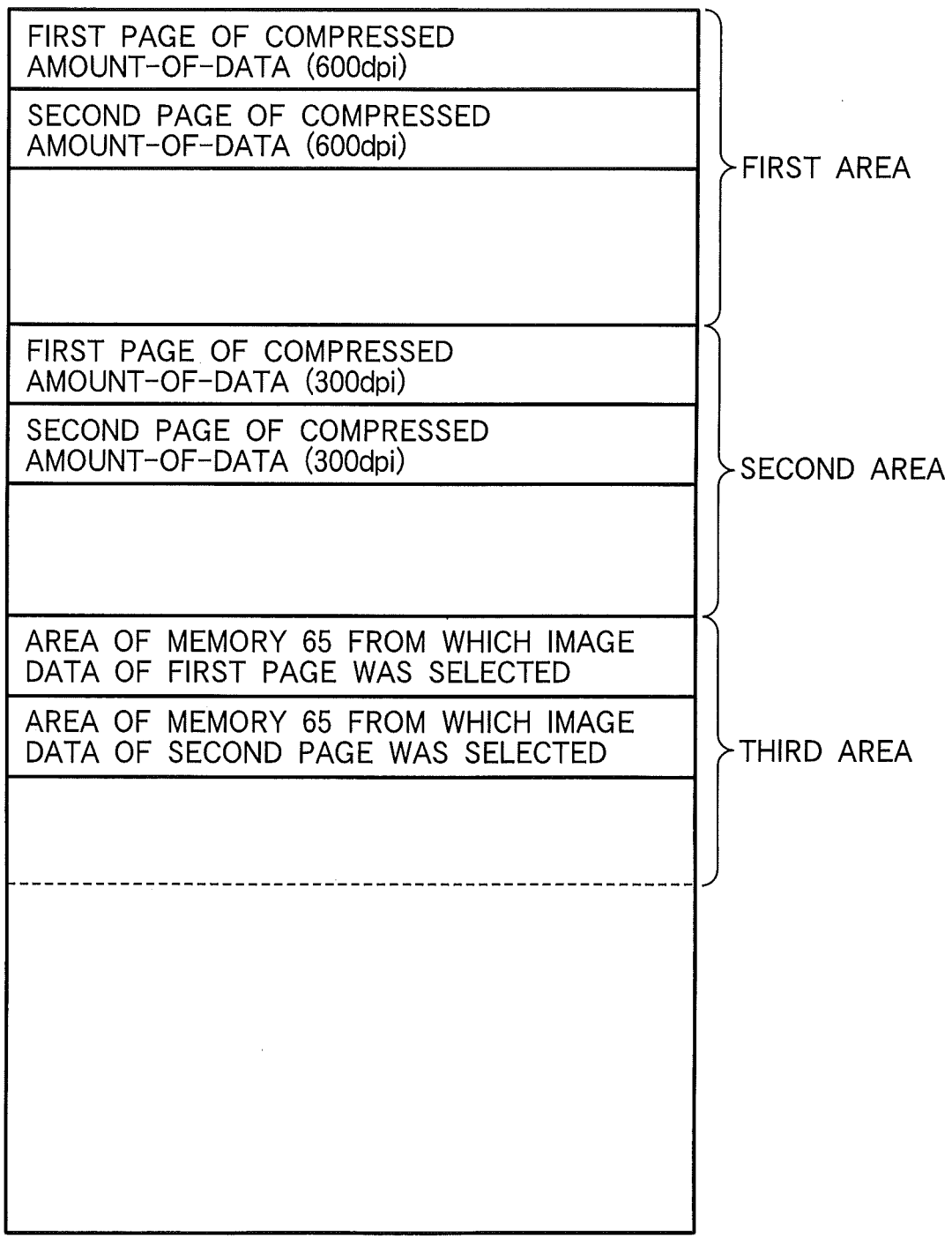
FIG. 7 illustrates first to fourth areas of a RAM.

FIG. 7 illustrates first to fourth areas of a RAM.

The RAM 53 is also partitioned into a plurality of areas. The areas include a first area that stores the data size of the respective page of the compressed image data having a resolution of 600 dpi, a second area that stores the data size of the respective page of the compressed image data having a resolution of 300 dpi, and a third area stores information on the selected image data. In other words, third area stores information indicative of one of the first to fourth areas of the memory 65 from which the image data was selected.

Figure 8:
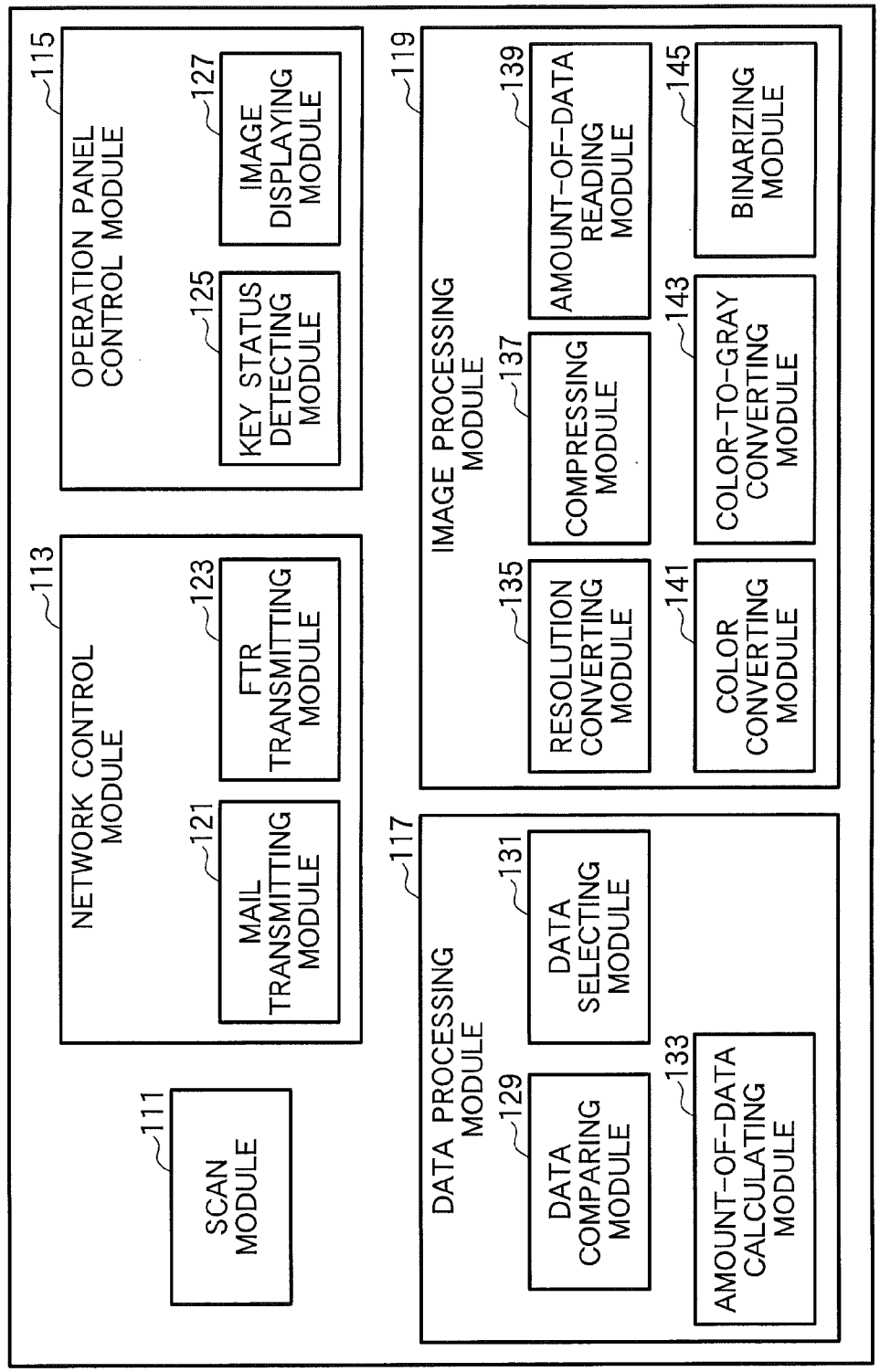
FIG. 8 is a block diagram illustrating the configuration of program modules of the first embodiment.

FIG. 8 is a block diagram illustrating the configuration of program modules executed by the CPU 51. The program modules include five modules: a scan module 111 for reading the image of the original document, a network control module 113 for transmitting the image data, an operation panel control module 115 for controlling the operation panel 5, a data processing module 117 for processing data, and an image processing module 119 for processing images.

The scan module 111 is a module for controlling the image reading section 3. Upon executing the scan module 111, the CPU 51 sends a read command to the image reading section 3. Upon receiving the read command, the image reading section 3 sends the sensor drive signal to the reading sensor 11 and the motor drive signal to the motor 15. When the reading sensor 11 and motor 15 start to operate, the scanner 1 starts to read the image of the original document. The captured image is input into the amplifier 77, which in turn amplifies the captured image and outputs the amplified image to the A/D converter 79. The A/D converter 79 converts the analog output of the amplifier 77 into a digital image signal. Then, the shading correcting section 81 and the γ correcting section 83 apply corresponding corrections to the digital image signal. Then, the digital image signal after corrections is supplied to the image memory 65 through the image bus I/F 85.

The network control module 113 includes a mail transmitting module 121 and an FTP transmitting module 123. The mail transmitting module 121 is used for sending emails. When the CPU 51 executes the mail transmitting module 121, the CPU 51 supplies a transmission command to the network I/F 63, the transmission command specifying the destination of the email and the image data to be attached to the email. The FTP transmitting module 123 is used for sending the image data to the FTP server. When the CPU 51 executes the FTP transmitting module 123, the CPU 51 sends a transmission command to the network I/F 63, the transmission command specifying the destination (FTP server) and the image data.

The operation panel control module 115 includes a key status detecting module 125 and a screen displaying module 127. The key status detecting module 125 is used to detect the status of the keys on the operation panel 5. When the CPU 51 executes the key status detecting module 125, the CPU 51 reads the statuses of the operation panel 5 at predetermined time intervals through the operation panel I/F 157, thereby detecting the statuses of the keys. The image displaying module 127 is used to control the LCD 21. When the image displaying module 127 is executed, the CPU 51 expands the image data on the RAM 53, and supplies the image data on display to the operation panel 5 through the operation panel I/F 57.

The data processing module 117 includes a data comparing module 129, a data selecting module 131, and an amount-of-data calculating module 133. The data comparing module 129 compares the data size of the image data for one page stored in the RAM 53 with a predetermined threshold value. This threshold value is determined taking into account the maximum data size of data that may be communicated within the network and the data size of image data that is actually communicated within the network. If the maximum data size of data that may be communicated within the network is comparatively small, the threshold value is set to low, taking into account the fact that the data to be transferred includes a plurality of items of image data. If the maximum data size is comparatively large, the threshold value is set to high in order to maintain the quality of image data. The user stores the thus selected threshold value into the ROM 55 in advance. When the CPU 51 executes the data comparing module 129, the CPU 51 compares the data size of the image data stored in the RAM 53 with a predetermined threshold value. The data selecting module 131 is used for selecting image data specified by the user from among a plurality of items of image data stored in the image memory 65. When the CPU 51 executes the data selecting module 131, the CPU 51 selects the image data specified by the user from the image memory 65, and reads the selected image data. The amount-of-data calculating module 133 is used for reading the data size of the compressed image data. When the CPU 51 executes the amountof-data calculating module 133, the CPU 51 calculates the sum of the data sizes stored in the first and second areas of the RAM 53.

The image processing module 119 includes a resolution converting module 135, a compression module 137, an amount-of-data reading module 139, a color converting module 141, a color-to-gray converting module 143, and a binarization module 145.

When the CPU 51 executes the resolution conversing module 135 and supplies a command to the image processing section 61, so that the resolution converter 99 of the image processing section 61 converts the resolution of the image data to a specified resolution.

The compression module 137 is used for compressing the image data. When the CPU 51 executes the compression module 137 and supplies a command to the image processing section 61, so that the compressing section 97 of the image processing section 61 compresses the image data.

The amount-of-data reading module 139 is used for reading the data size of the compressed image data. When the CPU 51 executes the amount-of-data reading module 139 and supplies a command to the image processing section 61, the data size detecting section 103 of the image processing section 61 detects the data size of each page of the compressed image data.

The color converting module 141 is used for performing color conversion on the image data. When the CPU 51 executes the color converting module 141 and then supplies a command to the image processing section 61, the color converting module 141 of the image processing section 61 performs color conversion on the image data.

The color-to-gray converting module 143 is used for converting color image data into gray image data. When the CPU 51 executes the color-to-gray converting module 143 and supplies a command to the image processing section 61, the color-to-gray converter 95 of the image processing section 61 converts the color image data to the gray image data.

The binarization module 145 is used for performing binarization on the image data. When the CPU 51 executes the binarization module 145 and supplies a command to the image processing section 61, the binarizing section 101 of the image processing section 61 generates binary image data based on the image data.

Figure 9:
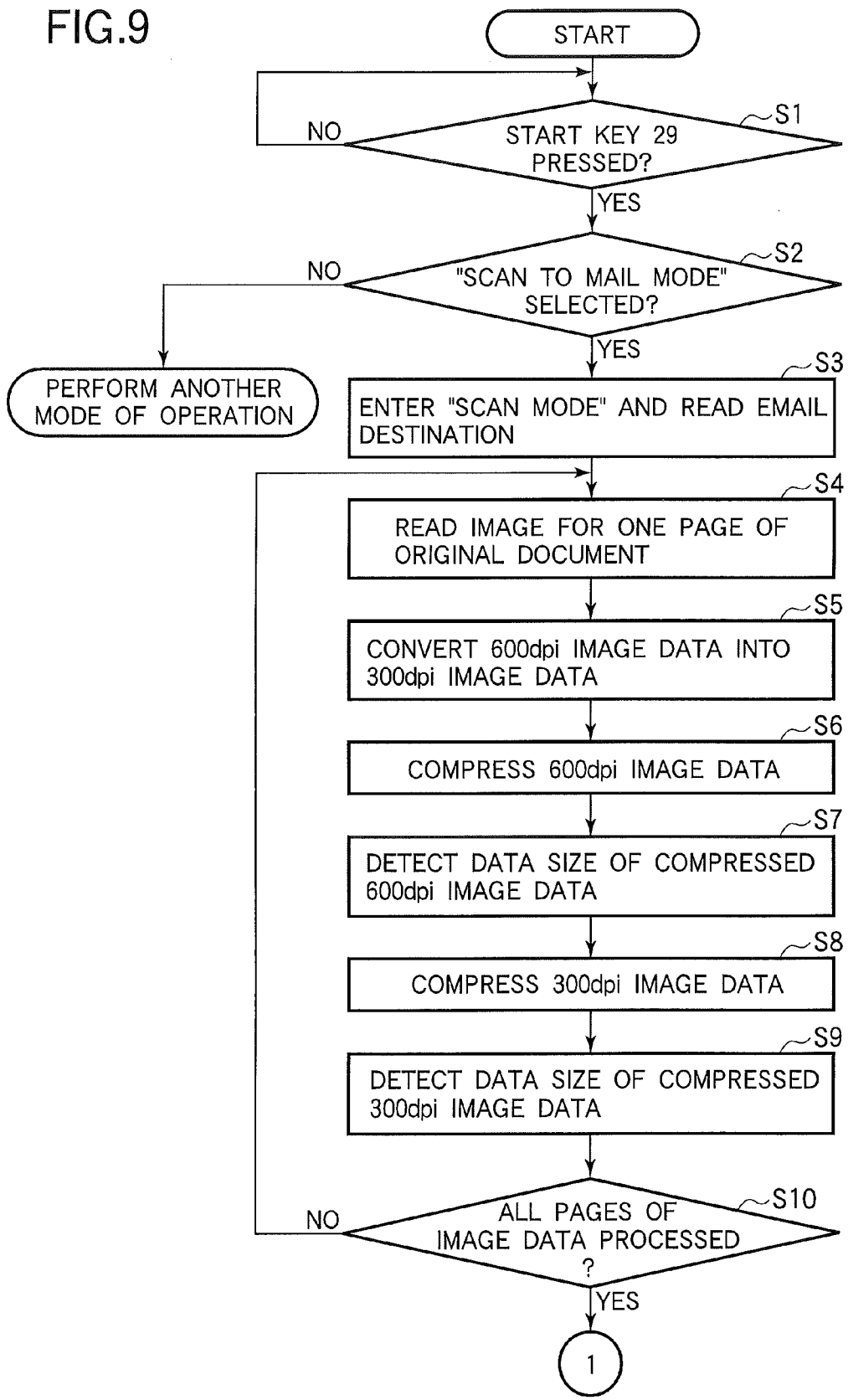
FIG. 9 is a first portion of a flowchart illustrating the operation of the scanner.

FIG. 9 is a first portion of a flowchart illustrating the operation of the scanner.

Figure 10:
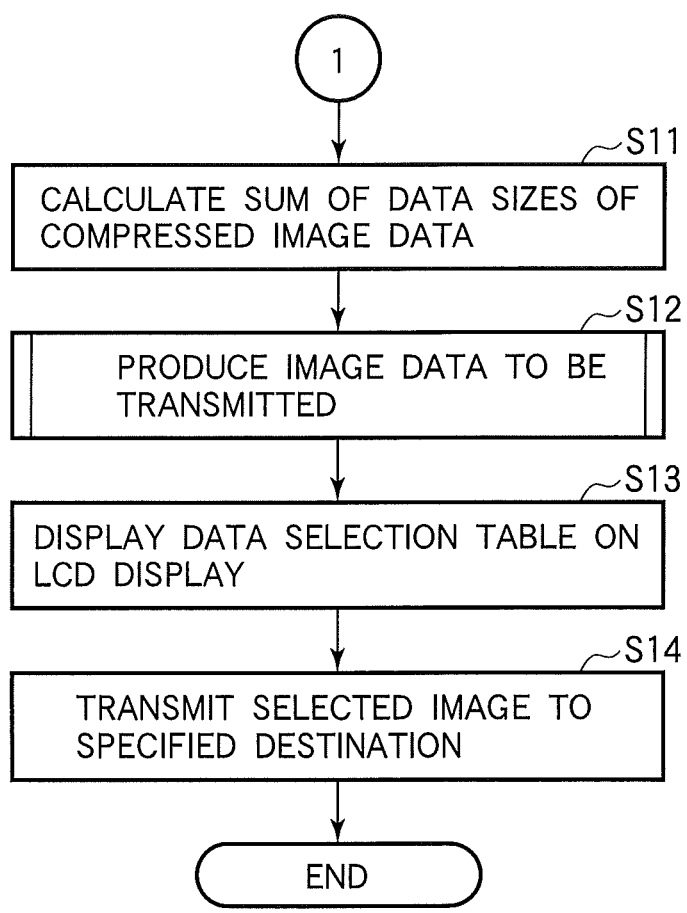
FIG. 10 is a second portion of the flowchart of FIG. 9.

FIG. 10 is a second portion of the flowchart of FIG. 9.

The operation of the scanner 1 will be described in detail with reference to FIGS. 9 and 10, by way of example of a "SCAN to MAIL MODE."

The CPU 51 invokes the program in the ROM 55, causing associated processes to start. At step S1, the scanner 1 makes a decision to determine whether the start key 29 has been depressed. If YES at step S1, the scanner 1 makes a decision to determine whether the "SCAN to MAIL MODE" has been selected (S2). If a mode other than the "SCAN to MAIL MODE", then the scanner 1 executes the selected mode. If YES at step S2, the scanner 1 proceeds to step S3.

At step S3, the scanner 1 reads an email destination, and enters the "READ MODE". Specifically, the scanner 1 reads an email address inputted by the user through the operation panel 5. Also, the scanner 1 enters the "READ MODE" (color or monochrome) for reading an image from an original document, the "READ MODE" being selected by the user.

Then, at step S4, the scanner 1 executes the scan module 111 to read the image of one page of the original document. The scanner 1 reads the image at the highest resolution (i.e., 600 dpi). The captured image is subjected to various corrections and processing in the reading controller 59, and is stored as image data having a resolution of 600 dpi into the first area of the image memory 65.

At step S5, the scanner 1 reads the image data having a resolution of 600 dpi from the image memory 65, and then converts the image data into image data having a resolution of 300 dpi. Specifically, the CPU 51 executes the resolution converting module 135 to make a replication of the image data having a resolution of 600 dpi into the RAM 53, and then compresses the image data in a specified data format, thereby producing compressed image data having a resolution of 300 dpi. Then, the compressed image data having a resolution of 300 dpi is stored into the second area of the image memory 65. Thus, the image memory 65 holds two types of image data: image data having a resolution of 600 dpi and image data having a resolution of 300 dpi.

At step S6, the scanner 1 compresses the image data having a resolution of 600 dpi stored in the first area of the image memory 65. Specifically, the CPU 51 executes the compression module 137 to read the image data having a resolution of 600 dpi from the first area of the image memory 65. Then, the CPU 51 makes a replication of the image data having a resolution of 600 dpi in the RAM 53, and compresses the image data into a specified data format, thereby obtaining compressed image data having a resolution of 600 dpi. The compressed image data having a resolution of 600 dpi is stored into the third area of the image memory 65. If the image memory 65 holds image data of a page corresponding to that of the compressed image data, the CPU 51 writes the compressed data over the existing image data.

At step S7, the scanner 1 detects the data size of the compressed image data. Specifically, the CPU 51 executes the amount-of-data reading module 139 to detect the data size of the compressed image data for one page of the image data having a resolution of 600 dpi, which has been in the third area of the image memory 65 at step S6. The CPU 51 stores the detected data size into the first area of the RAM 53.

At step S8, the scanner 1 compresses the image data having a resolution of 300 dpi, stored in the second area of the image memory 65. Specifically, the CPU 51 executes the compression module 137 to read the image data having a resolution of 300 dpi from the second area of the image memory 65. Then, the CPU 51 makes a replication of the image data having a resolution of 300 dpi in the RAM 53, and compresses the image data into a specified data format to produce compressed image data having a resolution of 300 dpi. Then, the compressed image data having a resolution of 300 dpi is stored into the fourth area of the image memory 65. If the fourth area of the image memory 65 holds image data of a page corresponding to that of the compressed image data, the CPU 51 writes the compressed data over the existing image data.

At step S9, the scanner 1 detects the data size of the compressed image data. Specifically, the CPU 51 executes the amount-of-data reading module 139 to detect the data size of the compressed image data having a resolution of 300 dpi, the data size being for one page of image data stored in the fourth area of the image memory 65. Then, the CPU 51 stores the detected data size into the second area of the RAM 53.

At step S10, the scanner 1 makes a decision to determine whether steps S4-S9 have been executed for all pages of the image data. Steps S4 to S9 are repeated until all pages of the image data have been processed.

FIG. 10 is a flowchart illustrating the operation of the scanner for producing the image data to be transmitted.

If YES at step S11, then the scanner 1 calculates the sum of the data sizes of the compressed image data (S11). Specifically, the CPU 51 executes the amount-of-data calculating module 133 to calculate the sum of the data sizes of all pages of the image data having a resolution of 600 dpi. The CPU 51 also calculates the sum of the data sizes of all pages of the image data having a resolution of 300 dpi.

Then, at step S12, the scanner 1 executes the process for producing image data for transmission.

Figure 11:
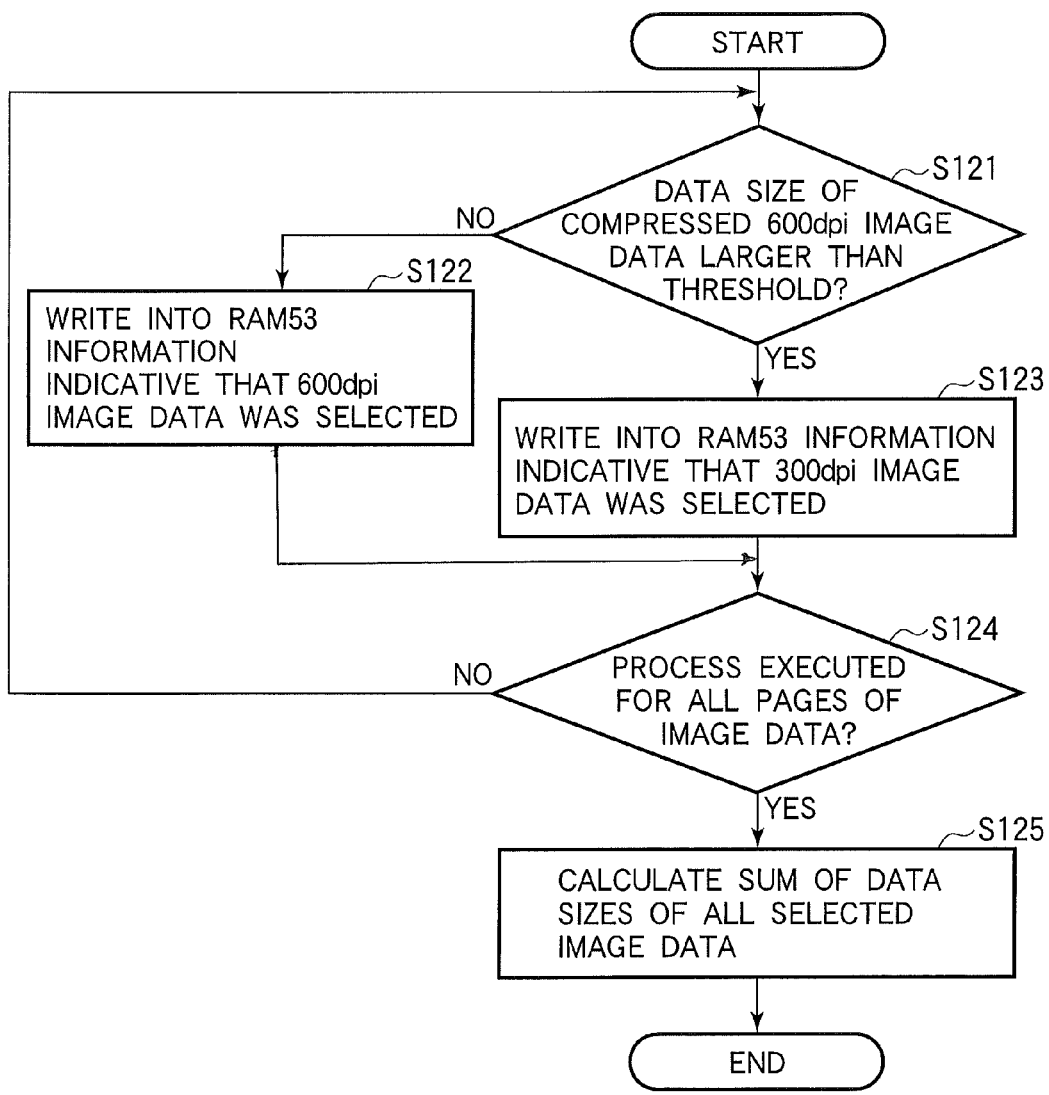
FIG. 11 is a flowchart illustrating the operation of the scanner for producing the image data to be transmitted.

FIG. 11 is a flowchart illustrating the operation of the scanner for producing the image data to be transmitted.

The specific process will be described with reference to FIG. 11.

At step S121, the scanner 1 makes a decision to determine whether the data size of the compressed image data having a resolution of 600 dpi is larger than a threshold value. Specifically, the CPU 51 executes the data comparing module 129 to compare the threshold value stored in the RAM 53 with the data size of the compressed image data for one page having a resolution of 600 dpi. In this manner, the CPU 51 determines whether the compared page of compressed image data may be transmitted at the highest resolution. If the threshold value stored in the RAM 53 is larger than the data size of the compressed image data for one page having a resolution of 600 dpi, the CPU determines that the compressed image data (600 dpi) may be transmitted.

Then, at step S122, the CPU 51 writes into the third area of the RAM 53 the information indicative that the image data having a resolution of 600 dpi was selected. If the threshold value stored in the RAM 53 is smaller than the data size of the compressed image data for one page having a resolution of 600 dpi, the CPU 51 determines that the compressed image data (600 dpi) may not be transmitted.

Then, at step S123, the CPU 51 selects the compressed image data having a resolution of 300 dpi, which has a lower resolution a smaller data size than 600 dpi image data, and writes into the third area of the RAM the information indicative that the image data having a resolution of 300 dpi was selected.

Then, at step S124, the CPU 51 makes a decision to determine whether the process has been executed for all the pages of the image data. If NO at step S124, then the steps S121-S123 are repeated until the process has been executed for all the pages of the image data. If YES at step S124, then the contents of the RAM 53 are then as shown in FIG. 12.

Figure 12:
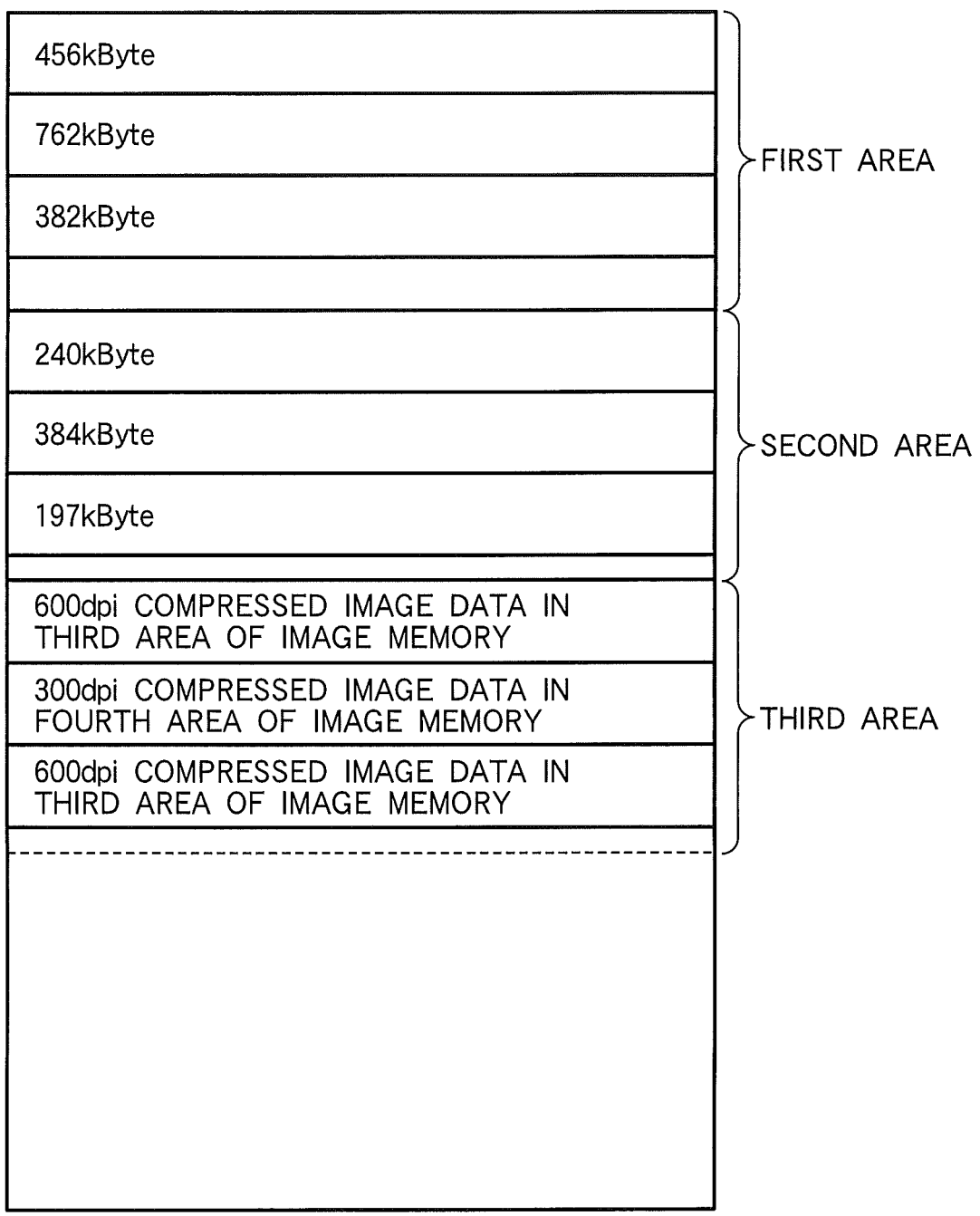
FIG. 12 illustrates the contents of the RAM when a threshold value is selected to be 500 kilobytes.
Figure 13:
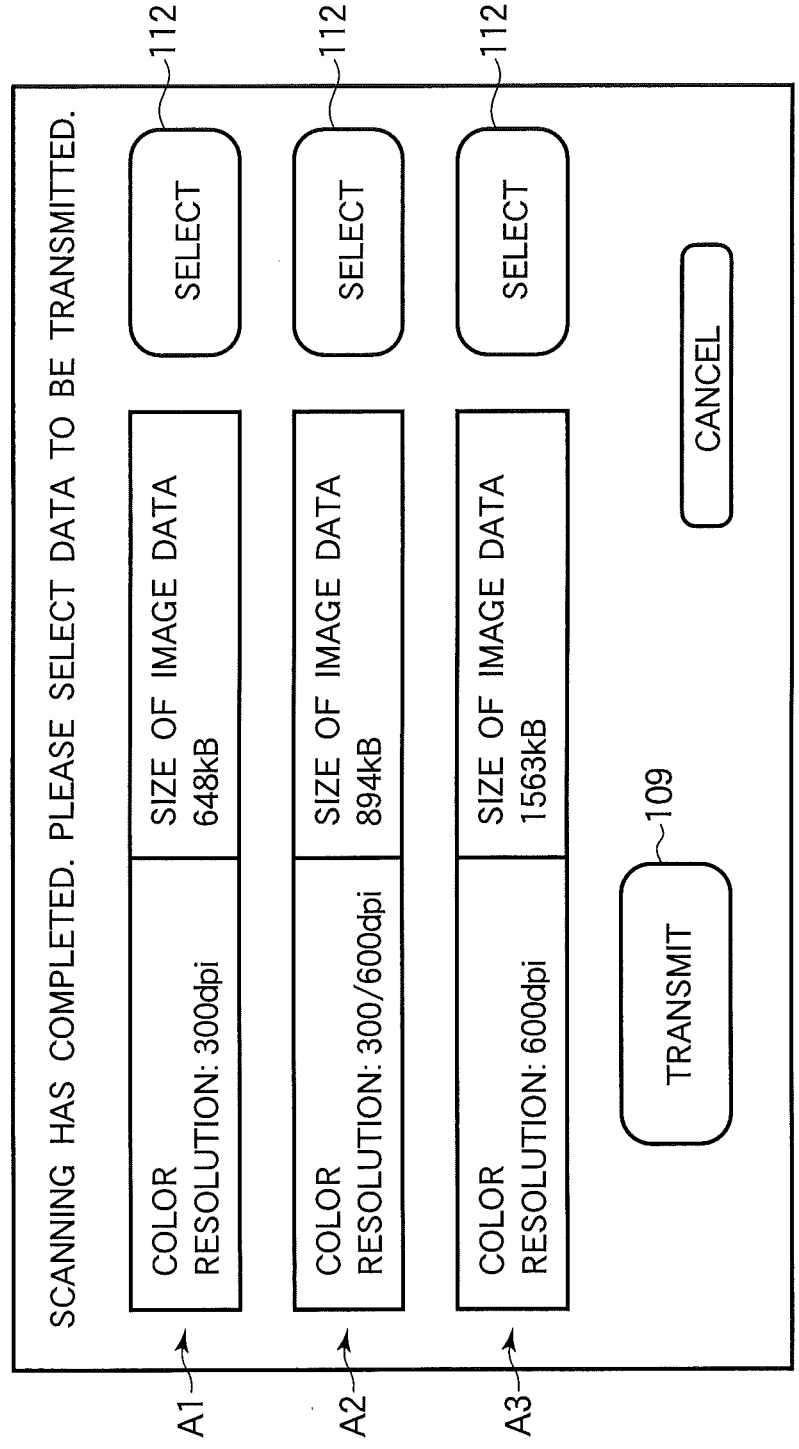
FIG. 13 illustrates a selection screen of the first embodiment.

FIG. 12 illustrates the contents of the RAM 53 when the threshold value is selected to be 500 kilobytes. FIG. 13 illustrates a selection screen.

The numerical values in the first area of FIG. 12 represent data sizes of the respective pages of the compressed image data having a resolution of 600 dpi while the numerical values in the second area of FIG. 12 represent data sizes of the respective pages of the compressed image data having a resolution of 300 dpi. The image data in the third area of FIG. 12 represent the resolution of the image data selected at steps S122 and S123. As depicted in dotted line, the data size of the second page of the image data is larger than the threshold, i.e., 762 kilobytes is larger than 500 kilobytes. Thus, the compressed image (384 kilobytes) data having a resolution of 300 dpi (second page of compressed image data (300 dpi) in the fourth area of FIG. 6) is selected for the second page, in which case, if the compressed image data having a resolution of 300 dpi exceeds the threshold, an "ERROR" is displayed.

After steps S121-S123 have been executed for all pages of the image data, the scanner 1 calculates the sum of the data size of all the selected image data (S125). Specifically, the CPU 51 executes the amount-of-data calculating module 133 to calculate the sum based on the contents in the third area of the RAM 53 and the data size of the compressed image data in the first and second areas. Upon completion of S125, the scanner 1 proceeds to step S13 of FIG. 10.

At step S13, the scanner 1 displays a data selection screen (FIG. 13) displayed on the LCD 21. Referring to FIG. 13, a plurality of options of image data to be transmitted is displayed on the LCD 21. Specifically, an area A1 represents the content of the compressed data having a resolution of 300 dpi and the sum of the data size of the image data. An area A2 represents the content of the image data to be transmitted, produced at step S12, and the sum of the data size of the image data. An area A3 represents the content of the compressed image data having a resolution of 600 dpi (highest resolution) and the sum of the data size of the image data. The user refers to the information in areas A1-A3 to select image data to be transmitted of a desired data size. Because the data selection screen displays the sum of the data sizes of the respective items of image data to be transmitted, the user may select data taking into account the capacity of the network.

Then, the user clicks a selection button 112 to select one of the plurality of image data to be transmitted, and then clicks the transmission button 109. Then, at step S14, the scanner 1 transmits the selected image data to a specified destination.

In this manner, a plurality of items of image data to be transmitted are produced and the contents and data sizes of the image data may be visually displayed to the user, so that the user knows the data size of the image data and selects the image data having a size of his preference. Transmitting the thus selected image data prevents the network traffic from increasing.

Second Embodiment

Elements common to those of the first embodiment have been given the same reference numerals and their description is omitted. Thus, a description will be given only of a portion different from that of the first embodiment.

Figure 14:
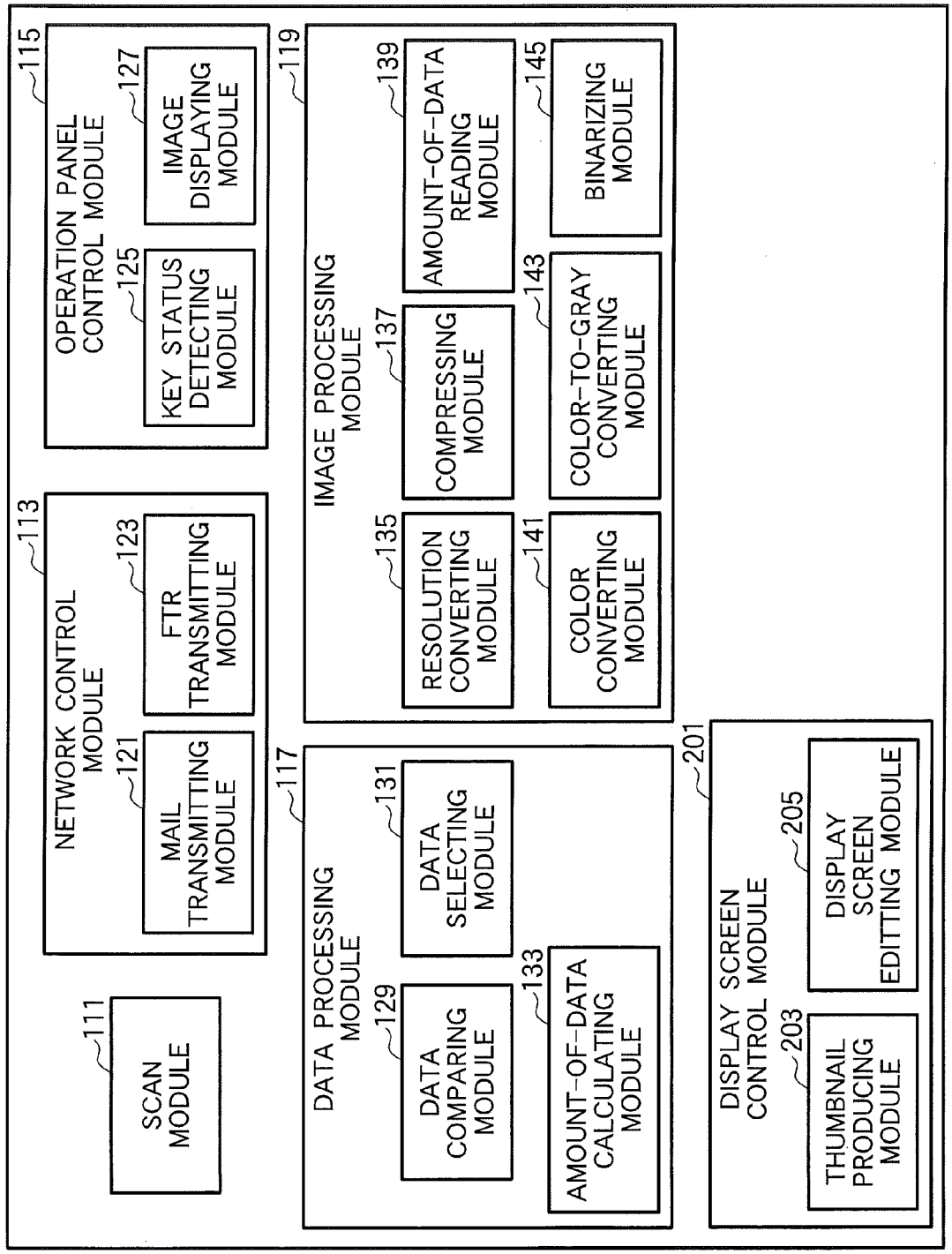
FIG. 14 is a block diagram illustrating the configuration of program modules of a second embodiment.

FIG. 14 is a block diagram illustrating the configuration of program modules of a second embodiment.

Figure 15:
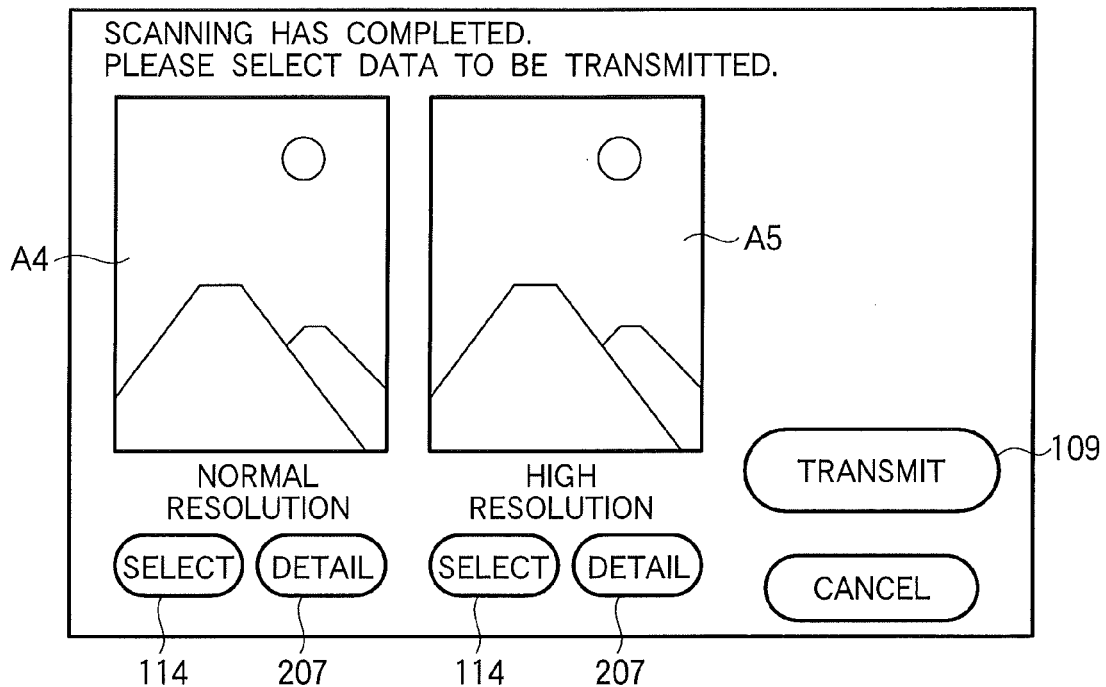
FIG. 15 illustrates a selection screen of the second embodiment.

FIG. 15 illustrates a selection screen.

Figure 16:
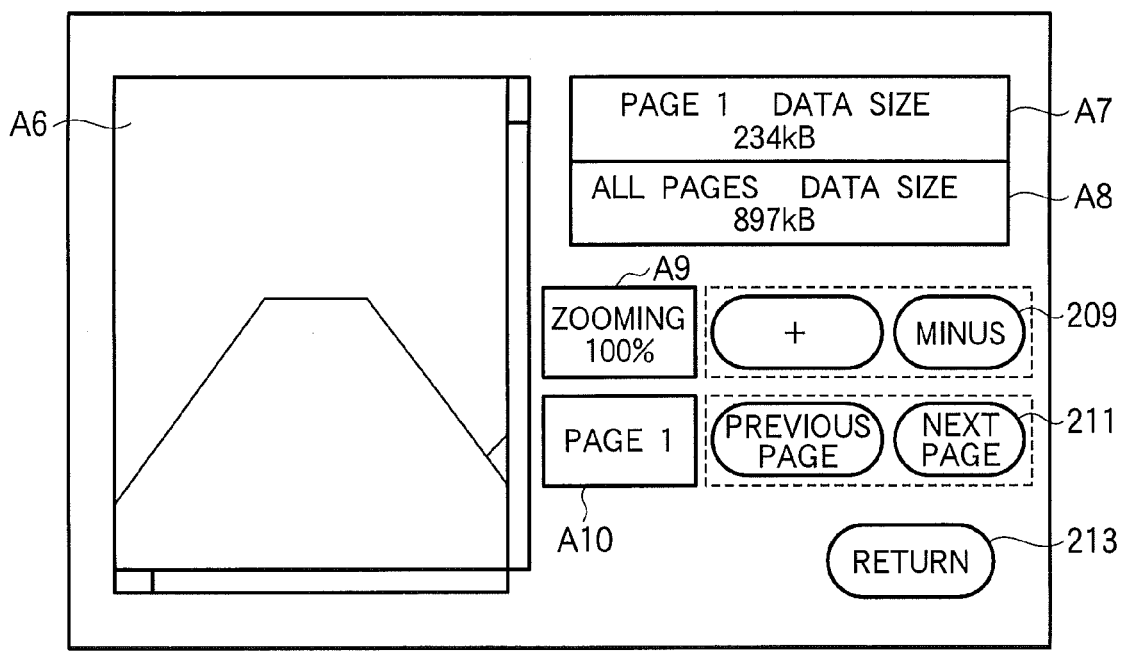
FIG. 16 is a detail setting screen.

FIG. 16 is a detail setting screen of the second embodiment.

Referring to FIG. 14, a scanner of the second embodiment includes a display screen control module 201.

The display screen control module 201 includes a thumbnail producing module 203 and a display screen editing module 205. The thumbnail producing module 205 is used for producing thumbnail data of image data. The display screen editing module 205 is used for editing a data selection screen.

When the thumbnail producing module 203 is executed, a CPU 51 supplies a command to an image processing section 61, so that the image processing section 61 converts the resolution of the compressed image data stored in the third area or the fourth area of an image memory 65 into another resolution. Then, the image processing section 61 reads the compressed image data from the third area and the fourth area, and converts their resolution, thereby producing thumbnail data based on the compressed image data. The thumbnail data is then stored into the RAM 53.

When the display screen editing module 205 is executed, the CPU 51 causes the LCD 21 to display the thumbnail data stored in the RAM 53. Specifically, the CPU 51 reads the thumbnail data from the RAM 53, and places the thumbnail data in an area of the screen display image data on the RAM 53. As a result, the data selection screen shown in FIG. 15 will appear on the LCD 21. The thumbnail image based on the compressed image data having a resolution of 300 dpi appears in an area A4. The thumbnail image based on the compressed image data having a resolution of 600 dpi appears in an area A5. Thus, the user is allowed to visually check the image data in more detail.

A "DETAIL" button 207 for setting the detail of the respective thumbnail image appears on the data selection screen. When the user clicks the "DETAIL" button 207, the CPU 51 controls the LCD 21 to display a detail setting screen as shown in FIG. 16. An area A6 represents an image based on corresponding compressed image data. An area A7 represents the data size of the compressed image data. An area A8 represents the sum of the data sizes of all pages. An area A9 represents a zooming factor. An area A10 represents the page number of the image currently on display. The detail setting screen allows the user to visually check the details of the contents of the image data.

Figure 17:
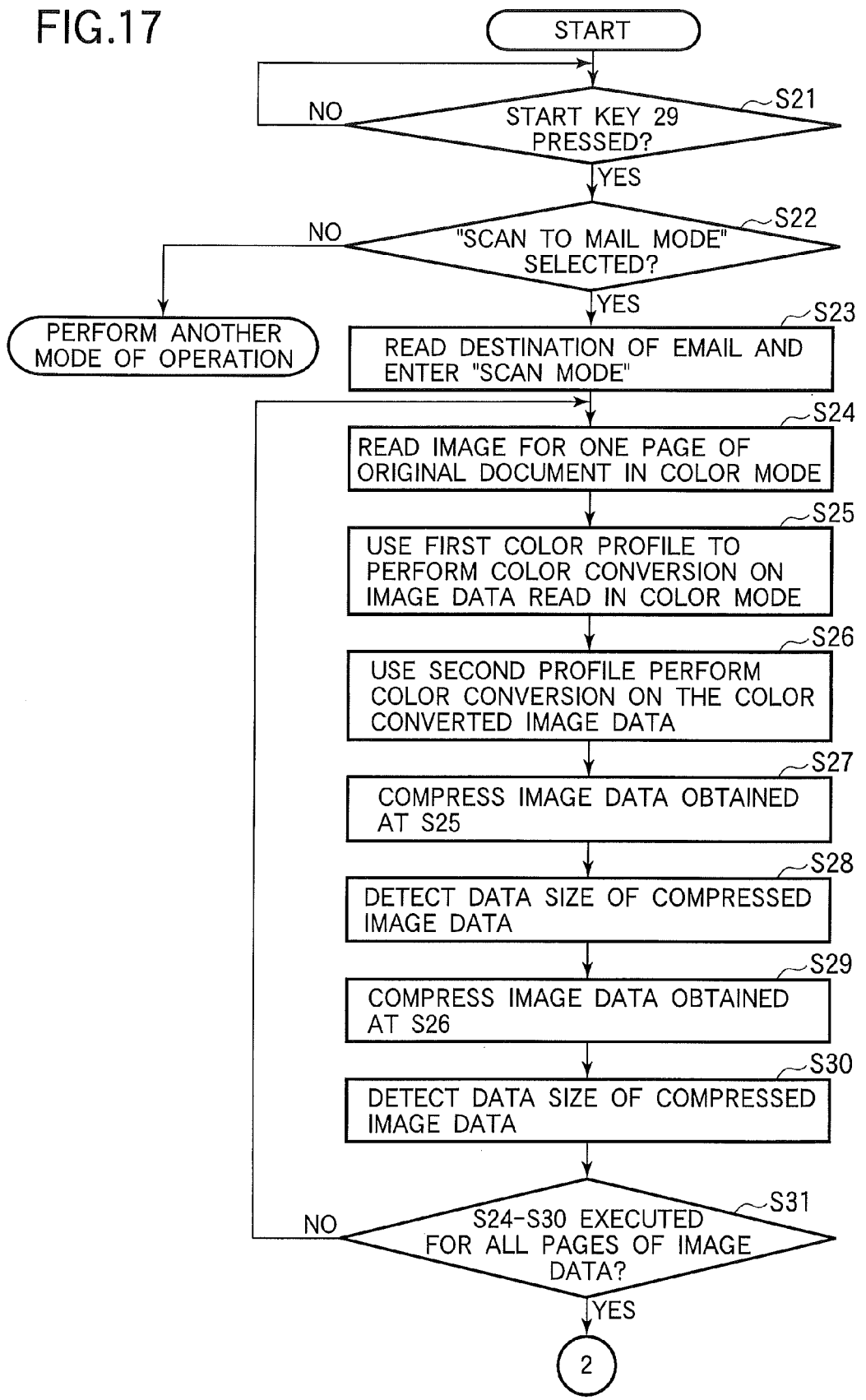
FIG. 17 is a first portion of a flowchart illustrating the operation of a scanner of the second embodiment.
Figure 18:
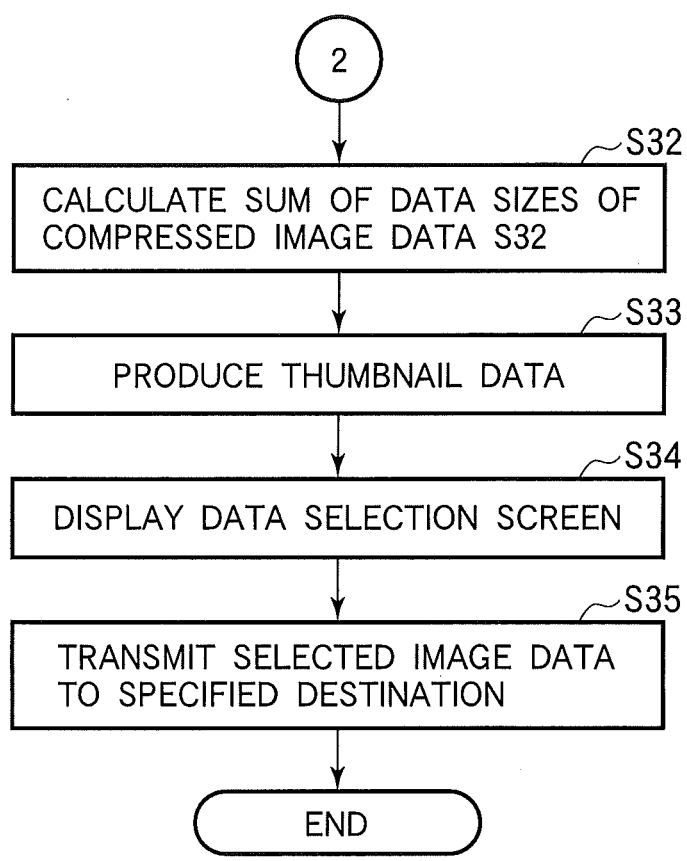
FIG. 18 is a second portion of the flowchart of FIG. 17.

FIG. 17 is a first portion of a flowchart illustrating the operation of a scanner of the second embodiment. FIG. 18 is a second portion of the flowchart of FIG. 17.

The operation of the scanner will be described in detail with reference to FIGS. 17 and 18.

After the CPU 51 invokes the program stored in the ROM 55 to initiate a series of associated processes, at step S21, the scanner makes a decision to determine whether a start key 29 has been depressed. If YES at step S21, the scanner makes a decision at step S22 to determine whether "SCAN TO MAIL MODE" has been selected. If a mode other than "SCAN TO MAIL MODE" has been selected, the scanner will operate in the selected mode. If the "SCAN TO MAIL MODE" has been selected, the scanner executes the steps at step S23 and onward.

At step S23, the scanner reads the destination of an email and enters the "READ MODE."

At step S24, the scanner executes the scan module 111 to read one page of the image of an original document in a color mode. The scanner provides various stages of signal processes on the image data read from the original document. The processed image data is stored as color image data into the image memory 65.

At step S25, the scanner reads the color image data from the image memory 65, and performs color conversion using a first color profile and then stores the converted image data into the first area of the image memory 65.

At step S26, the scanner reads the image data from the first area of the image memory 65, then performs color conversion using a second color profile, and finally stores the converted image data into the second area of the image memory 65.

At step S27, the scanner compresses the image data, which has been color-converted and stored in the first area of the image memory 65. The compressed image data is then stored into the third area of the image memory 65.

At step S28, the scanner detects the data size of the compressed image data, and then stores the detected data size into the first area of the RAM 53.

At step S29, the scanner compresses the image data, which has been color-converted using the second color profile and stored in the second area of the image memory 65. Then, the compressed image data is stored into the fourth area of the image memory 65.

At step S30, the scanner detects the data size of the compressed image data. The CPU 51 stores the detected data size into the second area of the RAM 53.

At step S31, the scanner makes a decision to determine whether steps S24-S30 have been executed for all the pages of the image data. If NO at step S31, steps S24-S30 will be executed until all the pages of the image data have been processed.

If steps S24-S30 have been executed for all the pages of the image data, then scanner calculates the sum of the data sizes of the compressed image data at step S32. At step S33, the scanner produces thumbnail data. Specifically, the CPU 51 executes the thumbnail producing module 203 to produce thumbnail data of the compressed image data, which has gone through the color-conversion based on the first color profile, and thumbnail data of the compressed image data, which has gone through the color-conversion based on the second color profile. The CPU 51 stores the thus produced thumbnail data into the RAM 53.

At step S34, the scanner controls the LCD 21 to display the data selection screen. The user refers to the data selection screen to select image data to be transmitted having the user's desired data size. The sum of the data sizes of the respective image data to be transmitted is displayed on the data selection screen. This allows the user to select image data taking the traffic capacity of the network into account.

The user clicks a selection button 114 to send one of the items of image data to be transmitted, and then clicks the transmission button 109. Then, at step S35, the scanner transmits the selected image data to the specified destination.

As described above, the apparatus of the second embodiment displays the thumbnail image to the user, allowing the user to know the details of the content of the image data.

The present invention is not limited to the aforementioned embodiments, and may be modified in any way without departing the scope of the invention.

For example, the threshold value of data size is selected based on the data capacity (i.e., traffic) of the network in the aforementioned embodiments. Such a threshold value may be selected according to the data size that can be attached to an email.

The invention being thus described, it will be obvious that the same may be varied in many ways. Such variations are not to be regarded as a departure from the scope of the invention, and all such modifications as would be obvious to one skilled in the art intended to be included within the scope of the following claims.

What is claimed is:

1. A method for processing an image, comprising:
obtaining first image information and second image information;
producing first image data and second image data based on the first image information and third image data and fourth image data based on the second image information, the first image data and the third image data being produced in a first data format, the second image data and the fourth image data being produced in a second data format different from the first data format;
storing a plurality of the produced image data into a memory section;
selecting from the plurality of the produced image data stored in the memory section, selection being restricted by comparing reference information with information about the image data; and
outputting a set of image data based on the selection, the set of image data including both image data produced in the first data format and image data produced in the second format.

2. The method for processing an image according to claim 1, wherein:
the second image data is produced based on the first image data; and
the fourth image data is produced based on the third image data.

3. The method for processing an image according to claim 2, wherein the first image data differs from the second image data and the third image data differs from the fourth image data in data size.

4. The method for processing an image according to claim 1, wherein the first image data and the third image data have a first image quality and the second image data and the fourth image data have a second image quality, the first image quality being higher than the second image quality.

5. A method for processing an image, comprising:
obtaining a first image information and a second image information;
producing first image data and second image data based on the first image information and third image data and fourth image data based on the second image information, the first image data and the third image data being produced in a first data format, the second image data and the fourth image data being produced in a second data format different from the first data format;
storing a plurality of the produced image data into a memory section; and
displaying as one of choices selectable information representing a set of image data, the set of image data including both image data produced in the first data format and image data produced in the second format.

6. The method for processing an image according to claim 5, further comprising:
receiving input for selecting the selectable information based on a user operation; and
outputting, on receiving the input, the set of image data by reading both the image data produced in the first data format and the image data produced in the second format based on selection information set before receiving the input.

7. The method for processing an image according to claim 6, further comprising generating the selection information by selecting image data from the plurality of the produced image data stored in the memory section, selection being restricted by comparing reference information with information about the image data.

8. The method for processing an image according to claim 5, wherein:
the second image data is produced based on the first image data; and
the fourth image data is produced based on the third image data.

9. The method for processing an image according to claim 8, wherein the first image data differs from the second image data and the third image data differs from the fourth image data in data size.

10. The method for processing an image according to claim 5, wherein the first image data and the third image data have a first image quality and the second image data and the fourth image data have a second image quality, the first image quality being higher than the second image quality.

* * * * *